UNITED STATES PATENT OFFICE.

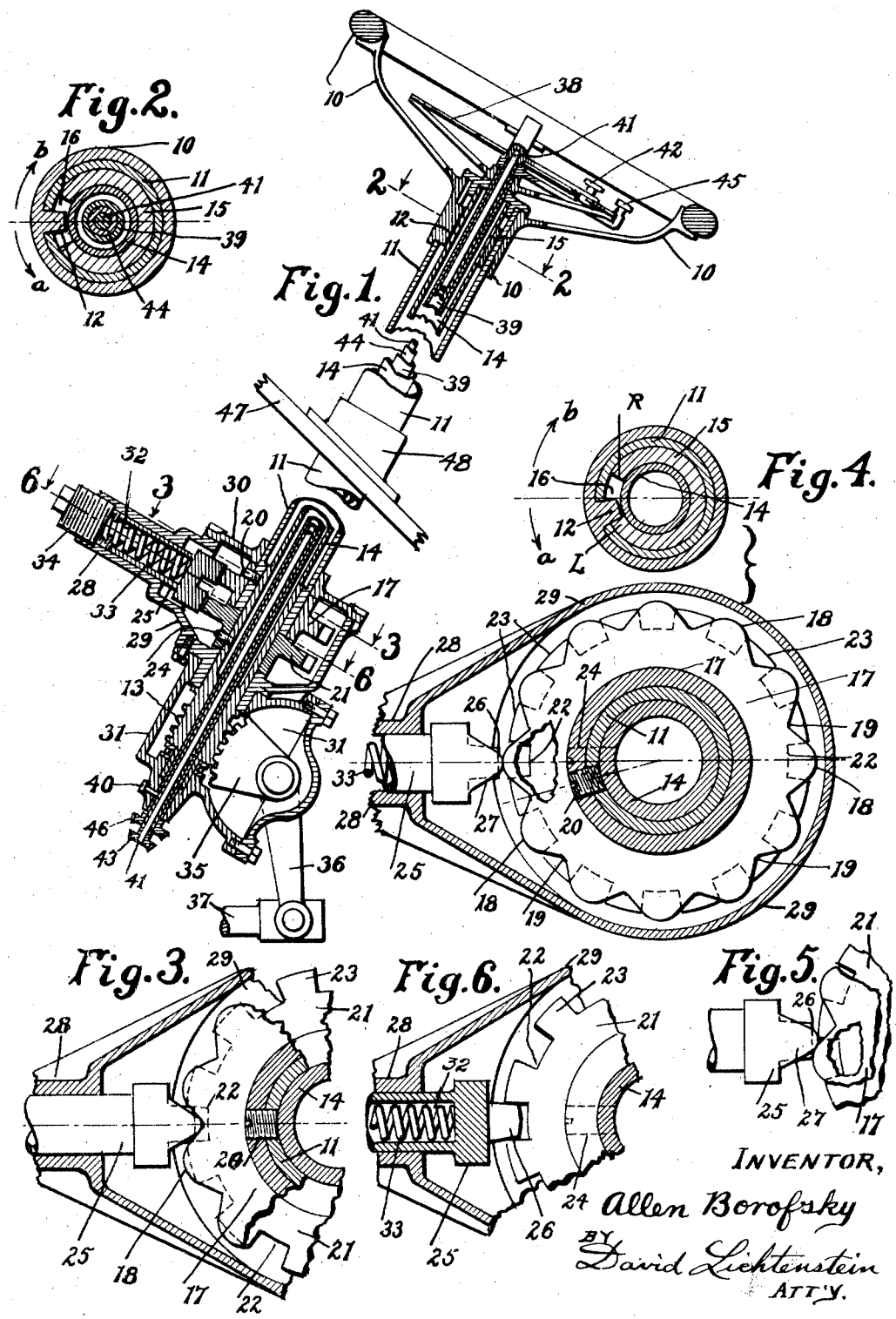

ALLEN BOROFSKY, OF ROXBURY, MASSACHUSETTS.

AUTOMATIC LOCKING DEVICE FOR STEERING-GEAR MECHANISMS.

1,341,256.  Specification of Letters Patent.  Patented May 25, 1920.

Application filed April 18, 1918. Serial No. 229,279.

*To all whom it may concern:*

Be it known that I, ALLEN BOROFSKY, a citizen of the United States of America, and resident of Roxbury, in the county of Suffolk and State of Massachusetts, have invented a new and useful Improvement in Automatic Locking Devices for Steering-Gear Mechanisms, of which the following is a specification.

My invention relates to locking devices for steering mechanisms used more especially in automobiles, and its object is to provide an automatic locking device which locks the steering gear mechanism in set position and prevents the same from being moved or influenced by road conditions met with in the line of travel of the vehicle.

Referring to the drawing, which shows one embodiment of the invention in connection with the worm and sector type of steering gear, and without being limited thereto—

Figure 1 represents a common type of steering mechanism supplied with my device, which is here shown enlarged for the purpose of exhibiting the same.

Fig. 2 is a sectional view taken on line 2—2, Fig. 1.

Fig. 3 is a sectional view taken on line 3—3, Fig. 1.

Fig. 4 is a similar view to Fig. 3 but shows the device in a released position.

Fig. 5 is a similar view to Fig. 4, showing the device in another of its released positions.

Fig. 6 is a sectional view taken on line 6—6, Fig. 1.

The terms employed herein are used in the generic and descriptive sense to designate the elements illustrated, and are therefore not specifically intended as terms of limitation.

Like numerals refer to like parts throughout the views of the drawing.

The numeral 10 represents a steering wheel which is secured to the steering post tube 11 or made integral therewith, according as may be desired. The steering post tube 11 is preferably provided at the steering wheel end with the key or lug 12 which is secured or made integral therewith, according as may be desired. 13 represents the steering worm which is secured to or made integral with the worm operating tube 14, according as may be desired. The latter tube 14 is preferably provided at the wheel end with the collar or flange 15 which lies in the plane of the key 12 and is provided with the key slot 16 which key 12 operates therein, said collar or flange being made integral with or secured to said tube 14 according as may be desired. 17 represents the unlocking cam disk which is preferably provided with the alternating circumferential series of peripheral scallops and depressions 18 and 19, respectively, and may be secured to the steering post tube 11, as by means of the screw 20 or some such other suitable means, or may be made integral therewith, according as may be desired.

21 represents the locking disk which is preferably provided with the circumferential series of radial locking slots 22 forming between them the lugs or teeth 23 and may be secured to the worm operating tube 14 as by means of the screw 24, or by other suitable means, or may be made integral with said worm operating member, according as may be desired. 25 represents a plunger member which is provided with the locking lug 26 and the cam lug 27; said lugs 26 and 27 lying in the planes of the locking disk 21 and the unlocking cam disk 17, respectively.

Said plunger member 25 is slidably housed in the radial plunger section 28 of the casing 29 which casing is preferably provided with the cover plate 30 and is secured to, or made integral with the steering worm casing 31, which is secured to the chassis, in any suitable manner, according as may be desired. The plunger member 25 is preferably provided with the bore 32 which houses the expansion spring 33 and is inclosed within said plunger section 28 by the adjustable plug 34 which may be adjustably screwed to said plunger section 28, as shown. 35 represents the operating worm gear sector which actuates the steering arm 36 which in turn operates the drag link 37. 38 represents an ordinary stationary timing arc which is secured to the stationary tube 39, which tube is held stationary in the casing member 31, as by means of the set screw 40, or by any other suitable means. 41 represents the ordinary spark controlling rod which is provided at the top with the spark lever 42 and at the bottom with the gear 43 which is coupled with the spark timing mechanism. The spark rod 41 is rotatably housed within the ordinary carbureter throttling tube 44 which in turn is rotatably housed within the aforesaid stationary tube 39 and is provided at the bottom with the throttling gear 46 which is coupled to the throttling mechanism of the carbureter. 47 represents the floor or dash board of the vehicle, and 48 a guide flange for the steering post.

Having thus described the parts of my invention in detail, the manner in which the same may be operated is as follows:

First, it will be observed that the steering post tube 11 is mounted over the worm operating tube 14 and is adapted to rotate angularly thereon through the distance provided therefor in the slot or recess 16 of the collar or flange 15, and the length of said slot is preferably made sufficient to allow the key 12 to travel an angular distance equal to the angle between the pitch radii of the scallops on the unlocking cam disk 17. It will also be observed that the "neutral" or locked position of the device is represented by Figs. 1, 2 and 3, particularly Fig. 2 wherein it will be seen that the key or lug 12 is positioned centrally in the slot 16. Fig. 3 shows the corresponding setting of the disks 17 and 21 for said "neutral" or locked position wherein the cam lug 27 and the locking lug 26 are in engaging position with a depression 19 and a slot 22 of the disks 17 and 21, respectively.

In turning the steering wheel to the left, as indicated by the arrows marked "a", the disk 17 is carried therewith while the worm operating tube 14 with the locking disk 21 remains stationary. The turning of the cam disk 17 from the position indicated in Fig. 3 to that shown in Fig. 4 causes the plunger 25 to move away from the locking disk and entirely disengages the plunger lug 26 therefrom, as shown in said Fig. 4, when it will be observed that the steering post key 12 is now angularly advanced from the "neutral" position shown in Fig. 1 to a position in which the key 12 is set adjacent to the left steering end of the flange 15. Any further advance of the steering post tube by the turning of the steering wheel in the direction of the arrow marked "a" beyond the position shown in Fig. 4, will not only carry the cam disk 17 therewith but also the worm operating tube which carries secured thereto the locking disk 21; the relative setting of the said two disks during their further travel in the "a" direction beyond the point shown in Fig. 4 will be maintained as shown in said Fig. 4, namely, with the scallops 18 of the cam disk 17 set over the locking slots 22 of the locking disk 21. With that relative setting between said disks it will be observed that as the disks are rotated together the plunger locking tooth 26 is afforded no opportunity to become engaged with the locking slots 22 of the locking disk 21, since the engagement of the plunger cam lug 27 with the scallops 18, as shown in Fig. 5, guides the plunger locking tooth 26 by and away from the locking slots 22 and positions it against the extreme ends of the teeth 23 of the locking disk 21. In like manner the plunger approaching scallop of the cam disk 17 engages with the plunger cam lug 70 and forces the plunger tooth 26 back and away from the passing locking slot 22 of the locking disk 21. In this way it will be understood that the steering device, through the operation of the steering wheel 10 in the left hand or "a" direction, may be turned to the extreme limit allowed by the steering mechanism without the slightest interference of the locking device associated therewith, that being true only and as long as the relative setting between the cam and locking disks is maintained, as shown in Fig. 4, which corresponds to the positioning of the steering key 12 in an adjacent position to the flange 15 as shown in said Fig. 4. Now, on the other hand, if it is desired to lock the steering mechanism in any of its advanced positions, a reverse turn on the steering wheel 10 sufficient to carry the key 12 back to its mid position in the slot, will yield a relative setting of the cam and locking disks, as shown in Fig. 3 wherein the scallops of the cam disk superimpose the teeth of the locking disks and the depressions of the cam disk superimpose the slots of the locking disk and the plunger locking tooth 26 is allowed to work into and engage with the nearest slot of the locking disk and consequently lock the steering mechanism. Thus it will be observed that the steering mechanisms will remain in the locked position until the operator manipulates the steering wheel again and advances the operating key 12 to engage with the flange 15, the turning of the steering wheel from its "neutral" or locked position to the engaging position of the key with the flange, operates the cam disk sufficient to release the plunger locking tooth from the locking slot of the locking disk and then the steering mechanism is free to turn.

In a similar manner the locking device will operate in the opposite direction of the steering mechanism, indicated by the arrow marked "b". In that direction, however, the key 12 is set adjacent to the opposite end "R" of the flange 15 for carrying the worm tube in the reverse or "b" direction, as will be understood; the function of my device being exactly duplicated in either of the operating directions of the steering mechanism.

Now, bearing in mind the working functions of my device, it will be readily understood that the same does not interfere with the steering operations of the steering mechanisms with which the same is associated; that the operator is not required to depart from the usual way of handling any of the ordinary steering gears; that while the operator is engaged in handling the steering wheel the locking device will not operate unless he requires it and positions the wheel for it; but that on the other hand, the locking device furnishes a means for stabilizing the steering gear and for further preventing the same from being influenced by road conditions as will be more fully explained.

Assuming that while the vehicle is in motion the operator is in the act of steering to one side or the other of the road and one or both of the forward wheels of the vehicle strikes an obstruction or irregularity in the road which tends to cause the forward wheels to swing farther in the direction that the operator is steering them; (as for example, referring to Fig. 4 when the operator is turning the steering wheel in the "$a$" direction and for some reason or other the flange 15 is caused to rotate faster than the key 12 is carrying it in said "$a$" direction), then as soon as the key 12 assumes the mid-position of the slot 16 the disks of the device become set in their relative locking position (as shown in Fig. 3) and the device consequently automatically locks the steering mechanism and holds it against responding to the force of the obstruction met with in the road, whereby the vehicle retains its desired course and the possible mishap is averted. But on the other hand, if the obstruction met with tends to swing the forward vehicle wheels in the opposite direction to what the operator is steering them, as for example, referring to Fig. 4, when the operator is in the act of steering the mechanism in the "$a$" direction and the force of the shock to the wheels meeting with the obstruction in the road tends to communicate a turning effort to the worm gear member 14 which carries the flange 15 in the "$b$" direction against the efforts of the operator who is turning the steering wheel in the "$a$" direction, then in such a case the operator feeling the back-strain on the steering wheel may reverse the steering wheel quickly through the small angle required to bring the key 12 in the mid-position of the slot 16 for relatively positioning the disks of the device to assume their locking positions, as shown in Fig. 3, when the device will automatically lock the steering mechanism and prevent the vehicle from making the forced detour which would otherwise result from such an encounter in the road. Such occurrences are more especially common with the rack and pinion types of steering devices to which my device is equally applicable, and while I have shown an embodiment thereof in connection with the worm and sector type of steering apparatus, I do not wish to be limited against using the same in connection with said rack and pinion types as well as other types used for the purpose wherever the same may be deemed to be applicable.

It will also be understood that my invention, aside from being a safety device, furnishes a means for resting the operator on straight road stretches, since the steering gear may be locked to run for a straight stretch without requiring the operator to handle the wheel as ordinarily is the case during such interval; and then again the device serves to take up the vibrations of the steering wheel, and consequently provides comfort in driving to the operator. In the locked position of the steering gear, the vehicle cannot be moved or influenced to detour from the path of travel set for the vehicle by the operator, while at the same time the latter may at all times manipulate the steering gear to yield the desired effects therefrom without any interference from the locking device.

It will be understood that while I have shown in the drawing the use of a single plunger, my device may be supplied with as many radial plungers distributed around the locking disks as may be desired. The mechanism of the locking device may be operated in a bath of oil or grease which will keep the same thoroughly lubricated and will cut down all possible friction to the working parts, making the same easy to manipulate and absolutely reliable and positive in its operations. Suitable spring adjusting means, as the adjustable plug 34, may be employed for adjusting the spring pressure against the plunger member. All of the ordinary operating elements accompany the usual types of steering gears, as the worm and sector, carbureter throttle and spark timing mechanisms, are manipulated in the usual manner and are not interfered with or hampered by the application of my device to such steering gears.

The pitch to the scallops and teeth of the locking disks may be made to suit and the plunger member may be provided with a plurality of locking lugs instead of the single lug shown if desired for engaging with a plurality of locking slots instead of a single slot as shown.

Having thus described my invention in detail, what I claim as new is:

1. In a device of the character described, a main steering gear member provided with a locking member adapted to rotate therewith, an operating member for said main steering gear member provided with an unlocking member adapted to operate therewith, a common plunger member normally engaging with said unlocking member and adapted to be actuated thereby, coupling means floatably coupling said main steering gear member with said operating member and adapted to impart a rotating motion to the former, and means for frictionally engaging said common plunger member with said unlocking member.

2. In a device of the character described, a main steering gear member provided with a locking member adapted to rotate therewith, an operating member for said main steering gear member provided with an unlocking member adapted to operate therewith, a common plunger member normally engaging with said unlocking member and adapted to be actuated thereby, coupling means floatably coupling said main steering gear member with said operating member and adapted to impart a rotating motion to the former, means for frictionally engaging said common plunger member with said unlocking member, and means for holding the aforesaid elements in working relation.

3. In a device of the character described, a main steering gear member provided with a locking member adapted to rotate therewith, an operating member for said main steering gear member provided with an unlocking member adapted to operate therewith, a common co-acting radial plunger member normally engaging with said unlocking member and adapted to be actuated thereby, and coupling means floatably coupling said main steering gear member with said operating member and adapted to impart a rotating motion to the former.

4. In a device of the character described, a main steering gear member provided with a locking disk, having a series of peripheral slots and adapted to rotate therewith, an operating member for said main steering gear member provided with an unlocking member having a series of peripheral scallops and adapted to operate therewith, a common plunger member provided with a locking tooth section for engaging the slots of said locking member and a rider cam section for normally engaging with said unlocking member scallops and adapted to control said plunger member, coacting coupling means floatably coupling said main steering gear member with said operating member and adapted to impart a rotating motion to the former, and means for frictionally engaging said common plunger member with either or both said unlocking and locking members according to their angular relationship therewith.

5. In a device of the character described, a main steering gear member provided with a locking disk adapted to rotate therewith and provided with a circumferential series of locking slots therein, an operating member for said main steering gear member provided with an unlocking or cam disk adapted to operate therewith and provided with a circumferential series of scallops, a common coacting radial plunger member normally engaging with the scallops of said unlocking or cam disk and adapted to be actuated thereby, and coupling means floatably coupling said main steering gear member with said operating member and adapted to impart a rotating motion to the former.

In testimony whereof I have hereunto set my hand this fifteenth day of April, 1918.

ALLEN BOROFSKY.